US010817520B1

(12) United States Patent
Zhang (10) Patent No.: US 10,817,520 B1
(45) Date of Patent: Oct. 27, 2020

(54) METHODS, SYSTEMS, AND COMPUTER READABLE MEDIUMS FOR SHARING USER ACTIVITY DATA

(71) Applicant: VCE Company, LLC, Richardson, TX (US)

(72) Inventor: Ying Victor Zhang, Plano, TX (US)

(73) Assignee: EMC IP HOLDING COMPANY LLC, Round Rock, TX (US)

( * ) Notice: Subject to any disclaimer, the term of this patent is extended or adjusted under 35 U.S.C. 154(b) by 564 days.

(21) Appl. No.: 14/631,218

(22) Filed: Feb. 25, 2015

(51) Int. Cl.
*G06F 17/00* (2019.01)
*G06F 7/00* (2006.01)
*G06F 16/2457* (2019.01)
*G06F 16/245* (2019.01)

(52) U.S. Cl.
CPC ...... *G06F 16/24578* (2019.01); *G06F 16/245* (2019.01)

(58) Field of Classification Search
CPC .................. G06F 17/3053; G06F 17/30424
USPC ......................................................... 707/748
See application file for complete search history.

(56) References Cited

U.S. PATENT DOCUMENTS

| | | | | |
|---|---|---|---|---|
| 5,628,004 A * | 5/1997 | Gormley | ................ | G06Q 30/02 707/999.104 |
| 6,006,215 A * | 12/1999 | Retallick | ................ | G06Q 10/04 707/999.002 |
| 6,732,088 B1 * | 5/2004 | Glance | ................. | G06F 16/951 707/E17.108 |
| 7,412,349 B2 | 8/2008 | Moser et al. | | |
| 7,617,201 B1 * | 11/2009 | Bedell | ............... | G06F 17/30536 707/999.005 |
| 7,797,421 B1 * | 9/2010 | Scofield | ................. | H04L 67/02 709/224 |
| 8,065,410 B1 * | 11/2011 | Breen | ................... | H04L 67/025 702/182 |
| 8,892,628 B2 * | 11/2014 | Nicholson | ............... | H04L 67/14 709/202 |
| 9,130,860 B1 * | 9/2015 | Boe | .................... | G06F 17/30572 |
| 9,235,644 B2 * | 1/2016 | Kasargod | ............... | G06Q 30/02 |
| 9,275,374 B1 * | 3/2016 | Mendis | ..................... | G06T 9/00 |
| 9,369,988 B1 * | 6/2016 | Johnson | ................ | H04W 88/02 |
| 9,491,131 B1 * | 11/2016 | Herrick | ................... | H04L 51/24 |

(Continued)

OTHER PUBLICATIONS

Commonly-assigned, co-pending U.S. Appl. No. 15/348,242 for "Methods, Systems and Computer Readable Mediums for Generating Key Performance Indicator Metric Test Data," (Unpublished, filed Nov. 10, 2016).

(Continued)

*Primary Examiner* — Pavan Mamillapalli
(74) *Attorney, Agent, or Firm* — Jenkins, Wilson, Taylor & Hunt, P.A.

(57) ABSTRACT

Methods, systems, and computer readable mediums for sharing user activity data are disclosed. According to one example, a method includes receiving a collection of user activity records, wherein each of the user activity records is associated with at least one user-defined system management query and analyzing the collection of user activity records to identify one or more correlations existing among the user-defined system management queries. The method further includes generating system management compilation data based on the identified one or more correlations and distributing the system management compilation data to a plurality of subscriber entities.

20 Claims, 3 Drawing Sheets

(56) References Cited

U.S. PATENT DOCUMENTS

| | | | |
|---|---|---|---|
| 9,582,534 B1* | 2/2017 | Hoover | G06F 16/9535 |
| 9,619,531 B2 | 4/2017 | Wu | |
| 9,619,583 B2* | 4/2017 | Lau | G06F 16/2457 |
| 10,176,075 B1 | 1/2019 | Juniel | |
| 2002/0144293 A1* | 10/2002 | Dimitrova | G06F 16/78 |
| | | | 725/133 |
| 2003/0110007 A1 | 6/2003 | McGee et al. | |
| 2004/0139426 A1* | 7/2004 | Wu | G06Q 10/10 |
| | | | 717/120 |
| 2004/0162724 A1* | 8/2004 | Hill | G10L 15/1822 |
| | | | 704/231 |
| 2005/0187917 A1* | 8/2005 | Lawande | G06F 16/24549 |
| | | | 707/999.003 |
| 2007/0150515 A1* | 6/2007 | Brave | G06F 16/9535 |
| | | | 707/E17.109 |
| 2007/0185913 A1* | 8/2007 | Reichert | G06F 11/3447 |
| | | | 707/E17.005 |
| 2008/0304808 A1* | 12/2008 | Newell | G11B 27/034 |
| | | | 386/278 |
| 2011/0184893 A1* | 7/2011 | Paparizos | G06F 16/24573 |
| | | | 706/12 |
| 2011/0307496 A1* | 12/2011 | Jones | G06F 16/24 |
| | | | 707/748 |
| 2013/0318236 A1* | 11/2013 | Coates | H04L 43/045 |
| | | | 709/224 |
| 2014/0181087 A1 | 6/2014 | Wu | |
| 2015/0146547 A1 | 5/2015 | Kapnadak et al. | |
| 2015/0161190 A1* | 6/2015 | Ariel | G06F 16/285 |
| | | | 707/609 |
| 2015/0281004 A1* | 10/2015 | Kakadia | H04L 41/0816 |
| | | | 370/235 |
| 2016/0034379 A1 | 2/2016 | Shah | |
| 2018/0018680 A1 | 1/2018 | Bs et al. | |

OTHER PUBLICATIONS

Non-Final Office Action for U.S. Appl. No. 15/348,242 (dated May 17, 2018).

Notice of Allowance and Fee(s) Due for U.S. Appl. No. 15/348,242 (dated Nov. 21, 2018).

Applicant Initiated Interview Summary for U.S. Appl. No. 15/348,242 (dated Aug. 7, 2018).

* cited by examiner

METHODS, SYSTEMS, AND COMPUTER READABLE MEDIUMS FOR SHARING USER ACTIVITY DATA

TECHNICAL FIELD

The subject matter described herein relates to computer management systems. More specifically, the subject matter relates to methods, systems, and computer readable mediums for sharing user activity data.

BACKGROUND

Management systems can include user interfaces (UIs), graphical user interfaces (GUIs), and/or application program interfaces (APIs) for managing, monitoring, viewing, and/or configuring one or more components (e.g., physical resources and/or virtual resources) within or associated with a computing system, such as a backend computing system separate from the management software. While management systems traditionally pre-defined a set of key performance indicators (KPIs) and/or related reports (i.e., with limited options with respect to personalization), recent advancements in this technological area have given rise to the proliferation of software-defined networks, virtualization, and highly-personalized user interfaces (e.g., such as search-centric interfaces and custom KPIs, rules, policies, and the like). However, impediments attributed to the resulting overhead and steep learning curve may hinder the adoption of such management systems and/or user interfaces. Notably, the inherent flexibility afforded by a search-centric user interface may require users to establish a large knowledge base of the discreet capabilities of a system, such as search syntax, system capabilities, rules, policies, and the like.

SUMMARY

Methods, systems, and computer readable mediums for sharing user activity data are disclosed. According to one exemplary embodiment, a method for sharing user activity data includes receiving a collection of user activity records, wherein each of the user activity records is associated with at least one user-defined system management query and analyzing the collection of user activity records to identify one or more correlations existing among the user-defined system management queries. The method further includes generating system management compilation data based on the identified one or more correlations and distributing the system management compilation data to a plurality of subscriber entities.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable mediums for sharing user activity data. In accordance with some aspects of the disclosed subject matter, functionality for sharing user activity data can involve interacting with one or more converged infrastructure system (CISs), such as an integrated infrastructure system (e.g., a Vblock® System from VCE Company, LLC), and/or computing system components (CSCs) therein. For example, a CIS can comprise multiple CSCs, such as physical resources and/or virtual resources, in a preconfigured or prepackaged computing platform, where some CSCs are developed and/or manufactured by multiple entities. For example, an exemplary CIS can comprise data storage devices, servers, networking equipment, software defined entities (including virtualization servers, networks, data center facilities, etc.) and management software. Although portions of the following disclosure describes the use of one or more CISs, any integrated infrastructure system or device can be utilized without departing from the scope of the present subject matter.

In accordance with some aspects of the disclosed subject matter, a computing platform (e.g., a node or device) or module (e.g., firmware, hardware, and/or software executing on a processor) can include functionality for sharing user activity data. For example, user activity data (e.g., user inputs, search queries, custom reports, and/or access patterns) can be collected and analyzed to ascertain correlations existing within the collected user activity data that can be distributed among a plurality of subscriber entities. As used herein, the terms "KPI" or "KPI definition" may refer to one or more data points and/or related algorithms and/or formulas using the one or more data points for indicating performance.

Advantageously, some aspects of the disclosed subject matter can allow a management system to efficiently distribute a full spectrum of user-defined KPIs, rules, policies, and queries by leveraging knowledge about past, present, and/or future data usage (e.g., system administrator use). For example, a management system may monitor cloud infrastructures across multiple locations, covering all aspects including physical, logical, and virtual resources. Using search-centric user interfaces, a user (e.g., a system administrator at a data center) can actively request particular information to be provided in specific, user-defined ways, as opposed to passively consuming what the system has pre-defined as available reports. By utilizing mechanisms for determining and sharing user activity data, such systems can provide increased usability (e.g., flexibility in defining custom KPIs), productivity (e.g., timely delivery of KPIs), and efficiency.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
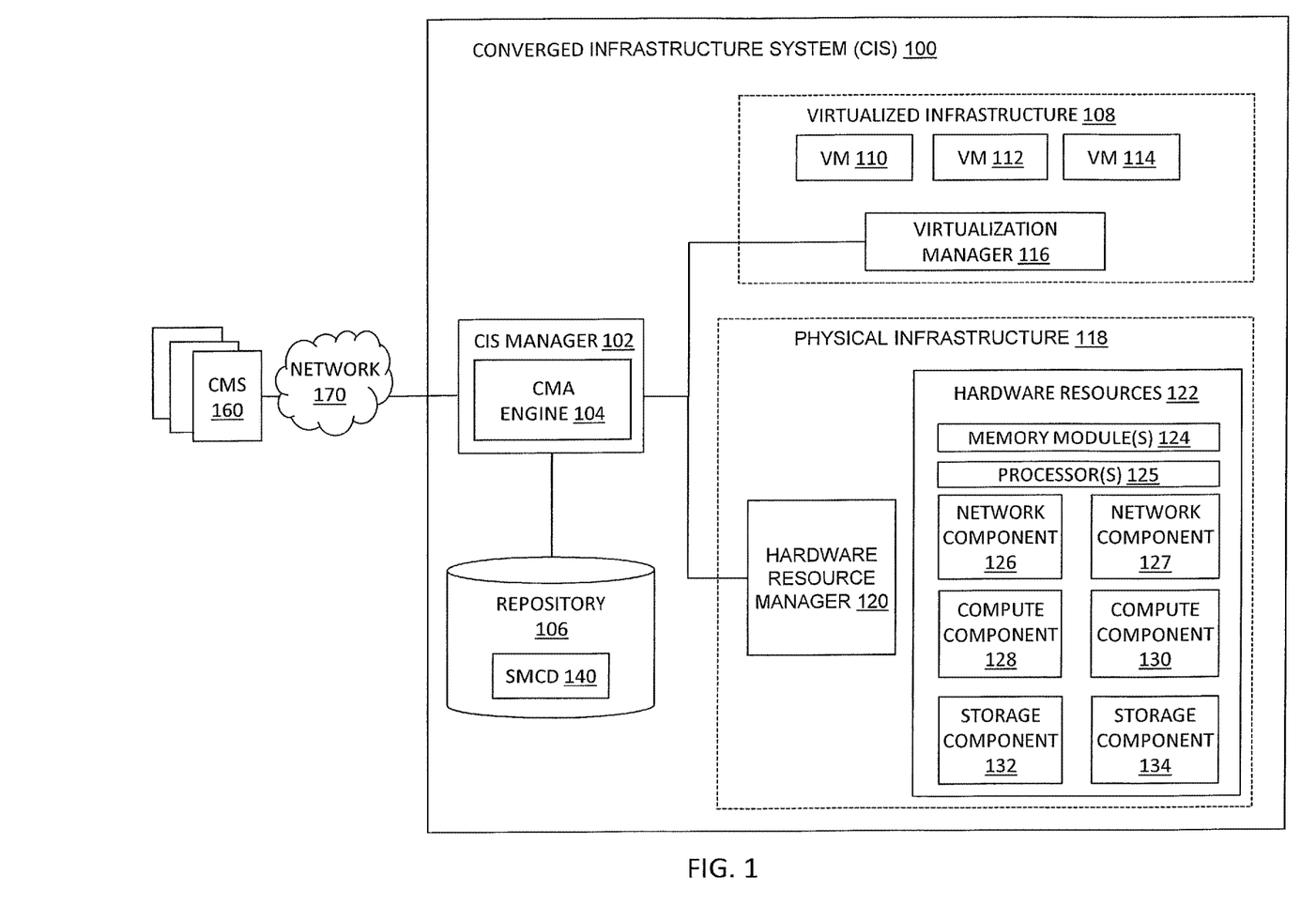
FIG. 1 is a diagram illustrating an exemplary converged infrastructure system according to an embodiment of the subject matter described herein.

FIG. 1 is a block diagram illustrating an exemplary CIS 100 according to an embodiment of the subject matter described herein. Although the following disclosure describes the use of CIS 100, any type of computer system can be utilized without departing from the scope of the present subject matter. CIS 100 can comprise CSCs, such as virtual resources and physical resources. Exemplary physical resources can comprise a processor, a memory module, a compute component, a network component, a storage component, a server, network equipment, a router, a switch, wiring or cabling, a storage device, a physical port, and/or a communications interface. Exemplary virtual resources can comprise a virtual entity (e.g., an entity that appears as a physical entity but comprises one or more components associated with one or more CISs), a virtual machine, a virtual server, a virtual storage device, a virtual port, and/or a virtual communications interface. CIS 100 can also comprise software and related components for managing the CIS and/or portions (e.g., CSCs) therein.

In some embodiments, CIS 100 can be configured to provide data management functionality, cloud service functionality, and/or other functionality. CIS 100 can be capable of communicating with other CISs (e.g., located at various physical locations or sites) and can communicate with various other entities, such as network nodes (e.g., servers hosting online sites) and users. For example, client 160 can represent any entity (e.g., software executing on a processor, a web-based interface, etc.) for allowing a user (e.g., a human operator or an automated system) to interact with CIS 100, CSCs therein, and/or other entities. In some embodiments, client 160 can communicate directly with CIS 100 with or without using network 170. In some embodiments, client 160 may include one of a plurality of cloud management servers (as shown and described below with respect to FIG. 2).

In some embodiments, CIS 100 can comprise a CIS manager 102, a repository 106, virtualized infrastructure 108, and/or physical infrastructure 118. CIS manager 102 can be any suitable entity for managing aspects of CIS 100 or portions therein (e.g., CSCs or groups of CSCs). CIS manager 102 can be configured to communicate with various CSCs and/or for managing various CSCs. For example, CIS manager 102 can be configured to access each CSC within CIS 100 and return relevant information to client 160. For example, CIS manager 102 can be configured to manage performance, resource utilization levels, and other aspects associated with virtualized infrastructure 108 and/or physical infrastructure 118. In some embodiments, CIS manager 102 can comprise VCE Vision™ Intelligent Operations software and/or firmware.

In some embodiments, CIS manager 102 can include a converged infrastructure management application for interacting with CIS 100 and/or CSCs therein. In such embodiments, the converged infrastructure management application can include or provide a graphical user interface (GUI), a command-line interface (CLI), an application programming interface (API), and/or or other communications interface. For example, a converged infrastructure management application can provide a web-based GUI containing a query page for requesting information about a CIS 100 and/or CSCs therein.

CIS manager 102 can comprise or interact with a communal management analysis (CMA) engine 104. CMA engine 104 can be any suitable entity (e.g., hardware, firmware, and/or software executing on a processor) for performing one or more aspects associated with analyzing and sharing user activity data. In some embodiments, CMA engine 104 and/or a related entity may collect and/or analyze user activity reports including user activity data (e.g., user-defined system management query data) originating from at least one CMS 160. In some embodiments, system management query data can include at least one of a search query, a user activity, a user input, a KPI (e.g., a custom KPI or a KPI definition), a custom indicator, an access rule, a security policy, a quality of service (QoS) policy, historical information, preconfigured information, management information, and/or user preference information. For example, and exemplary query may include a free form entry such as "Amount of traffic bandwidth consumed by network component NC234 in converged infrastructure C1456."

In some embodiments, CMS 160 may initially receive user-defined system management query data as a submission from a client entity comprising one or more of a user interface, a computing platform, a computing device, a converged infrastructure system, a virtual machine, a hypervisor, a compute component, a network component, a storage component, software, an operating system, firmware, hardware, a physical resource, and/or a virtual resource. Afterwards, the CMS 160 may forward user activity reports containing the user-defined system management query data to CMA engine 104. In some embodiments, the system management query data may be periodically and/or aperiodically (e.g., dynamically) received from a front-end server (e.g., see FIG. 2) associated with CMS 160. For example, CMA engine 104 may receive or collect custom user activity records containing KPIs and/or related KPI definitions across multiple computing systems and/or cloud management servers.

After receiving the user activity reports, CMA engine 104 and/or a related entity may analyze a plurality of user activity reports to identify correlations and generate performance metric information based on the correlations. Exemplary performance metric information includes a compiled top ten list of the most popular or most frequently accessed KPIs associated with a CIS, a particular CSC and/or a group of CSCs, a set of users, a location, or other criteria. For example, CMA engine 104 and/or a related entity may forward the generated top ten list to a dispatcher element or module (see FIG. 2 below for more detail) for distribution among a plurality of subscribed entities (e.g., a plurality of system administrators).

In some embodiments, user activity data can include search history information, user input information, custom KPIs, security policy information, quality of service (QoS) policy information, access rules, execution frequencies, historical information, preconfigured information, and user preference information. For example, user activity data can provide insight into what users are most focused on, their use patterns, and/or their preferences.

In some embodiments, aggregated user activity report information and/or correlations of the same can be stored in repository 106. Repository 106 can include any data storage unit (e.g., a database or plurality of databases) that can be configured to store system management compilation data 140, which may include analyzed and/or correlated user activity data, such as lists of frequently accessed KPIs, rules, policies, user searches, and/or other information. Although FIG. 1 depicts repository 106 as a local data storage unit residing on CIS 100, repository 106 can also be embodied as a data storage unit located at an online location (e.g., a public distributed content site), on a local proxy server in a customer's or system administrator's environment, or on a different CIS without departing from the scope of the disclosed subject matter. Further, repository 106 can be implemented using one or more computing platforms, devices, or systems.

In some embodiments, repository 106 can be provisioned with user activity data from a second repository (e.g., from a second CIS or from an online location, such as a known, online site that can be hosted by the CIS manufacturer). For example, user activity data can be obtained or copied from a second repository (e.g., a second CIS, an online site, online repository, or any other online location) over network 170, using secure copy (SCP) protocol, file transfer protocol (FTP), secure file transfer protocol (SFTP), hypertext transfer protocol (HTTP), or any like protocol. In some embodiments, CIS 100 and a second CIS can be located at a common site and can be communicatively connected by a wired connection. In such a configuration, repository 106 can be provisioned with user activity data from the second CIS via the wired connection. Such a mechanism enables a redundant CIS to be utilized n the event a primary CIS fails or is incapacitated due to a catastrophic event. It is understood that the provisioning of repository 106 with user activity data using the exemplary methods described above can be conducted via any automated or automatic manner. In addition, user activity data copied from a second repository and installed into repository 106 can utilize any form of transportable mediums, such as a compact disc (CD), flash memory, a universal serial bus (USB) device, and the like.

Virtualized infrastructure 108 can comprise a virtualization environment configured to simulate components of a computing device, such as a processor, system memory, and a storage device, for executing one or more virtual machines (VMs) (e.g., VM 110, VM 112, and VM 114). Each of VM 110, VM 112, and VM 114 can be configured to perform various functions and/or services, such as web server functions or cloud application services, and can interact with various nodes, components, and/or users.

In some embodiments, virtualized infrastructure 108 can be associated with one or more virtual entities. Each virtual entity can comprise one or more CIS or portions therein, e.g., CSCs from one or more CISs. In some embodiments, virtualization manager 116 can allow logical entities to be created, deleted, or modified using an API and/or a GUI. Virtualization manager 116 can be any suitable entity (e.g., software executing in a virtual machine) for managing aspects associated with virtualized infrastructure 108. In some embodiments, virtualization manager 116 can be configured for providing data management via one or more communications interfaces. For example, virtualization manager 116 can communicate with one or more third-party management tools using APIs.

Physical infrastructure 118 can comprise hardware resources 122, such as memory module(s) 124, processor(s) 125, network components 126-127, compute components 128-130, and storage components 132-134. Hardware resources 122 can be communicatively connected to various other CSCs in CIS 100 and other entities. Hardware resources 122 can be configured for use by one or more virtual entities. In some embodiments, network components 126-127 (e.g., network switches) can be configured to enable communication between the components in CIS 100. In some embodiments, one or more file share storage (FSS) systems (not shown) can be utilized to provide file system level access to a CIS across a local area network (LAN).

Hardware resource manager 120 can be any suitable entity (e.g., software executing in a virtual machine) for managing aspects associated with physical infrastructure 118. In some embodiments, hardware resource manager 120 can be configured to provision hardware resources 122 via one or more communications interfaces. For example, hardware resource manager 120 can provision hardware resources 122 for implementing one or more virtual entities in virtualized infrastructure 108. In some embodiments, hardware resource manager 120 can comprise any management component or entity, such as a unified infrastructure manager (UIM) or a unified computing system (UCS) director entity, which is configured to provision the physical hardware of CIS 100.

In some embodiments, processor(s) 125 can include a microprocessor (e.g., a trusted platform module (TPM) using trusted execution technology (TXT)), central processing unit (CPU), or any other like hardware based processing unit. In some embodiments, some aspects of the disclosed subject matter can be stored in memory module(s) 124, which can include random access memory (RAM), read only memory (ROM), optical read/write memory, cache memory, magnetic read/write memory, flash memory, or any other non-transitory computer readable medium. In some embodiments, processor(s) 125 and memory module(s) 124 can be used to execute, implement, and/or manage the operation of some aspects of the disclosed subject matter. In some embodiments, each of storage components 132-134 can include any storage medium or storage unit that is configured to store information accessible by processor(s) 125 via a system bus. In some embodiments, repository 106 or portions thereof can utilize storage components 132-134 and/or memory module(s) 124. In some embodiments, repository 106 and/or storage components 132-134 can include or utilize one or more storage area networks.

As indicated above, the subject matter disclosed herein can be implemented in software in combination with hardware and/or firmware. For example, subject matter described herein can be implemented in software executed by a processor. In some exemplary implementations, the subject matter described herein can be implemented using a computer readable medium having stored thereon computer executable instructions, which when executed by a processor of a computer, cause the computer to perform steps. Exemplary computer readable mediums suitable for implementing the subject matter described herein include non-transitory devices, such as disk memory devices, chip memory devices, programmable logic devices, embedded memory devices, and application specific integrated circuits. In addition, a computer readable medium that implements the subject matter described herein can be located on a single device or computing platform or can be distributed across multiple devices or computing platforms. For example, CMA engine 104 or repository 106 (e.g., a system library or data therein) can be located at a single computing system or can be distributed across one or more devices, platforms, and/or systems. As used in the disclosed subject matter, the terms "function" or "module" refer to hardware, firmware, or software in combination with hardware and/or firmware for implementing features described herein.

In some embodiments, various entities depicted in FIG. 1 can be incorporated or implemented using one or more other entities depicted in FIG. 1. For example, memory module(s) 124 and/or processor(s) 125 can be incorporated in compute component 128, compute component 130, and/or a specialized device or compute component (e.g., an application management pod (AMP)). In another example, CIS manager 102 can be implemented using or located in an AMP and/or another device in physical infrastructure 118. In yet another example, virtualization software and/or virtualized components can be implemented using an AMP and/or another compute device (e.g., a blade appliance designated for some system management software).

It will be appreciated that FIG. 1 is for illustrative purposes and that various components, their locations, and/or their functions as described above in relation to FIG. 1 can be changed, altered, added, or removed. For example, CMA engine 104 can comprise multiple, distributed components, e.g., a reporting component associated with reporting data usage and user activities, a collector component for collecting user activity reports, an analyzer component for analyzing an aggregation of user activity reports to identify one or more correlations among the user activity data, and a dispatcher component for distributing performance metric information that is generated based on the identified correlations. An exemplary CMA engine 104 is described below as a CMA server 204 with respect to FIG. 2. Further, aspects of the disclosed subject matter (e.g., CMA engine 104) can be implemented and/or located on any computing system or components therein.

Figure 2:
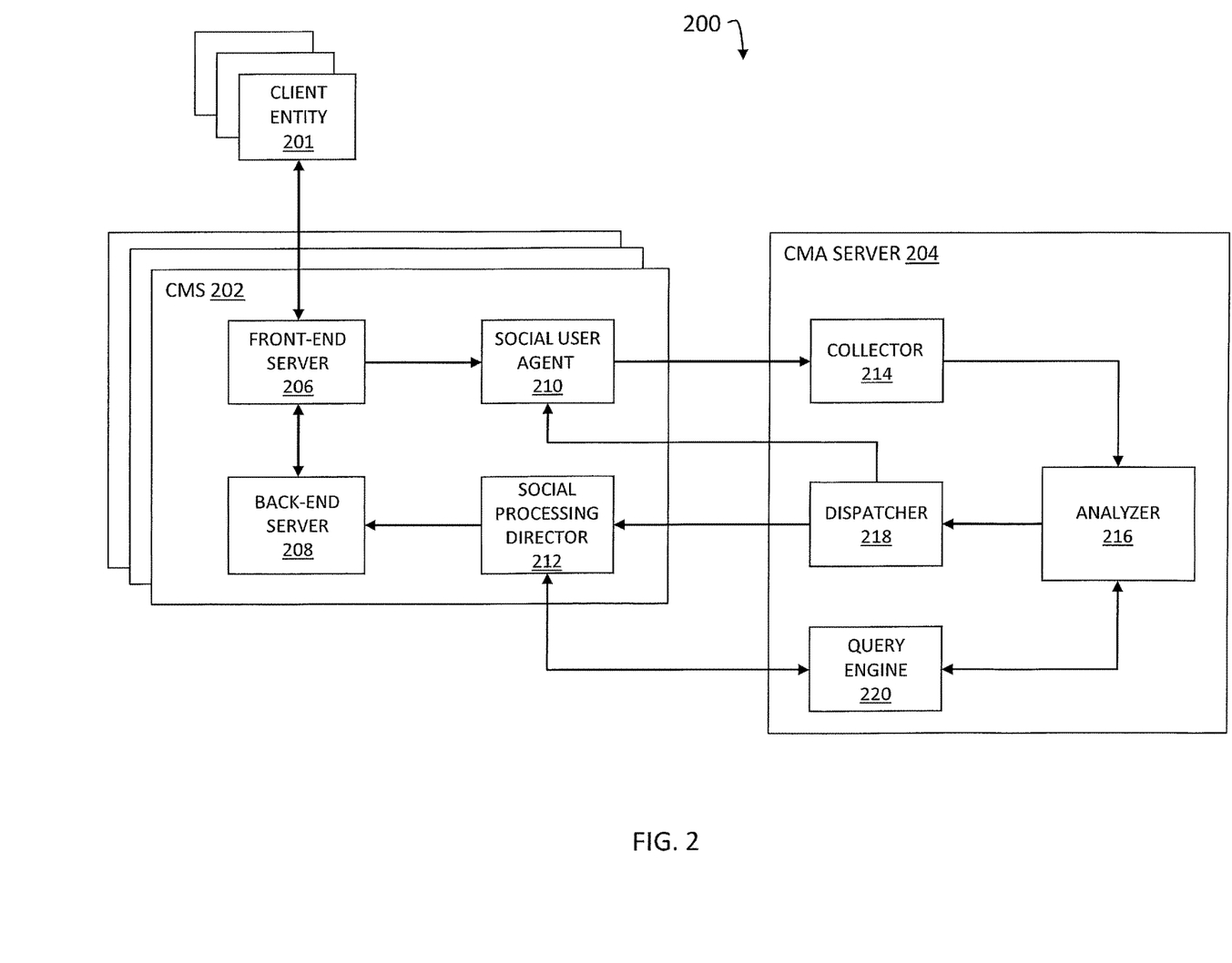
FIG. 2 is a diagram illustrating an exemplary management system for sharing user activity data according to an embodiment of the subject matter described herein.

FIG. 2 is a diagram illustrating an exemplary computer management system 200 for sharing user activity data according to an embodiment of the subject matter described herein. Exemplary system 200 can include one or more entities (e.g., subsystems, modules, and/or components) for performing one or more aspects associated with sharing user activity data.

Referring to FIG. 2, system 200 can include one or more a cloud management servers (CMS) 202 and a communal management analysis (CMA) server 204. In some embodiments, each CMS 202 may comprise a front-end server 202, a back-end server 208, a social user agent (SUA) 210, and a social processing director (SPD) 212. In some embodiments, CMS 202 is communicatively connected to a plurality of client entities 201. Each of client entities 201 may comprise a computer client machine that enables a system administrator or a network operator to submit a user defined query to front-end server 202. Further, CMA server 204 may also include a collector module 214, an analyzer module 216, a dispatcher module 218, and a query engine module 220. As used herein, each of elements 202-220 may comprise a software module or element that is executed by a hardware based processor associated with CMS 202 or CMA server 204.

In some embodiments, front-end server 206 can be any suitable entity or entities (e.g., software executing on one or more processors) for communicating with a user or client entity (e.g., client entities 201) and/or for providing data associated with one or more data requests. For example, front-end server 206 can include a computing platform that supports a search-centric user interface that may be configured for receiving data requests or queries (e.g., a user-defined system management query) from a requesting client entity 201, such as a system administrator, a network operator, or a management system. In some embodiments, each of client entities 201 may include at least one of a user interface, a computing platform, a computing device, a converged infrastructure system, a virtual machine, a hypervisor, a compute component, a network component, a storage component, software, an operating system, firmware, hardware, a physical resource, and/or a virtual resource. In some embodiments, a system management query data can include at least one of a search query, a user activity, a user input, a KPI, a custom indicator, an access rule, a security policy, a quality of service (QoS) policy, historical information, preconfigured information, management information, and/or user preference information.

Notably, the search-centric user interface may empower a client entity to define metric data and/or results that are most applicable to the user's query (i.e., as opposed to the system indicating predefined material). For example, a query (e.g., free form or natural language query) can be sent from client entity 201 to front-end server 206. More specifically, a client entity can input a free form or natural language query in a search-center user interface that is subsequently submitted. The user interface and/or a related application hosted by client entity 201 may then send the query to front-end server 206 via an HTTP message or other message.

Upon receipt by front-end server 206, the query can be parsed. For example, a grammar or syntax parser (e.g., software executing on a processor) in front-ends server 206 can analyze the received query and generate a data structure (e.g., a phrasing tree) for storing a representation of the free-form query. In this example, the parser and/or a related application supported by front-end server 206 can use the data structure to generate the user activity data (which represents the user behavior and/or inputs included in the received queries).

In some embodiments, front-end server 206 can also be configured to provide user defined system management queries and requests to back-end server 208 and to receive responses from back-end server 208. Further, front-end server 206 can be configured to use the responses from back-end server 208 to provide information (e.g., system management compilation data) to the requesting client entity 201 as well as other client entities 201 that may be subscribed to receive the system management compilation data. In some embodiments, front-end server 206 may be further configured to provide the requests or queries from the requesting entities to SUA 210 as user activity reports containing user defined system management query data.

In some embodiments, SUA 210 can be any suitable entity or entities (e.g., software executing on one or more processors) for providing the user activity records to collector 214 in CMA server 204. Notably, the user activity records may contain the user defined system management query data originated by client entities 201. For example, SUA 210 can periodically (e.g., asynchronously at a predefined fixed interval) report user activity reports to collector 214. Exemplary forms of user defined system management query data included in the user activity reports may include, but are not limited to, user inputs, custom KPIs, search queries, access rules, security policies, and the like. In some embodiments, different types of user activity data may be packaged and compiled by SUA 210 into user activity reports. The user activity reports may then be sent to collector 214 in CMA server 204 for further processing. In some embodiments, there may be multiple SUAs 210 utilized in system 201. For example, there may be one SUA associated with each system administrator operating in system 200.

Collector 214 can be any suitable entity or entities (e.g., software executing on one or more processors) that is configured to receive user activity records from SUA 210. In some embodiments, collector 214 may be further configured to aggregate user activity records received from a plurality of different SUAs during a predefined time interval. After aggregating a collection of user activity records, collector 214 may then provide the resulting collection of records (containing system management query data) to analyzer 216 for processing.

Analyzer 216 can be any suitable entity or entities (e.g., software executing on one or more processors) that is configured to persist (e.g., store) and subsequently analyze system management query data included in the collection of user activity records in order to identify one or more correlations. For example, analyzer 216 may be configured to extract the system management query data from the user activity reports and attempt to find similarities or commonalities existing in the analyzed data with respect to predefined criteria (e.g., metric data associated with an established policy and/or hardware elements). In some embodiments, analyzer 216 may correlate, rank, prioritize, group, and/or sort the extracted system management query data based on various factors, such as the complexity of the data, the frequency of patterns associated with the data, the amount of processing time, the popularity or frequency of the query data, and the like. For example, analyzer 216 can extract metric data from the user-defined system management query data in the aggregated user activity records. For example, analyzer 216 may extract and collect data such as when (e.g., time of day) and where (e.g., the location, the particular CIS, and/or the endpoint) data queries or user activities originate. As it analyzes the data, analyzer 216 can determine correlations existing with the extracted system management query data in order to identify the most popular and/or most frequently requested metric information (e.g., such as queries made in the last two hours). Further, analyzer 216 can be configured to subsequently provide the analyzed information to dispatcher 218 as system management compilation data. In some embodiments, analyzer 216 is also configured to persist and/or store extracted user-defined system management query data in a repository (e.g., repository 106 in FIG. 1) or some other storage medium.

In one example, a user may build a custom query that is configured to request a report of network traffic throughput originating from a VM. The query may be further configured to consider the network traffic throughput covering both the virtual transport network and the underlying physical transport network. In the event that this query is subsequently repeated with respect to the same or other VMs (e.g., by other users in the network), analyzer 216 may be configured to detect the repeated pattern/frequency of this particular query type in the collection of user activity reports being analyzed and, in response, initiate the execution of a report on all VMs and determine the top 20 VMs that are exhibiting throughput difficulties and/or inefficiencies (as indicated by returned performance metrics) with respect to both virtual components and hardware elements. Such findings may be forwarded from analyzer 216 to dispatcher 218, which may subsequently generate a representative report that is made available to the subscriber entities.

In another example, if several users build a query or request for the same KPIs on various data center facility entities of a particular type, analyzer 216 may be configured to pre-generate the KPIs for subsequent queries/request by other users on the same type of entities. In addition, analyzer 216 may be further configured to, upon analyzing the queries and/or requests included in the collection of user activity records, rank and categorize these queries and requests based on a particular criteria (e.g., the most frequently used query on network performance, the most frequently used query on server utilization, the most frequently used query KPIs on software defined network, and the like).

Dispatcher 218 can be any suitable entity or entities (e.g., software executing on one or more processors) for performing one or more aspects associated with the distribution of system management compilation data generated by analyzer 216. In some embodiments, dispatcher 218 receives system management compilation data that includes correlations (e.g., extracted patterns) that were identified and/or ranked by analyzer 216. In some embodiments, dispatcher 218 can receive the generated system management compilation data based on the identified one or more correlations ascertained by analyzer 216. For example, if a custom KPI for a particular server is frequently requested by many users, analyzer 216 may detect such a frequency and subsequently generate system management compilation data that is representative of such a request in the context of other custom KPIs (e.g., a list including a top ten ranking of custom KPIs associated with the particular server). In some embodiments, dispatcher 218 can request and/or receive a top ten list of frequently requested KPIs associated with compute components, network components, and/or data storage components from analyzer 216. Upon receiving a top ten list, dispatcher 218 may be configured to provide this system management compilation data to one or more SPDs 212 in system 200. In some embodiments, dispatcher 218 may include a subscription module (not shown) that is configured to maintain subscription records of client entities that have subscriptions to receive the system management compilation data (or particular types/portions of system management compilation data). In some embodiments, the subscription records may include database entries that map subscriber entities and/or associated SPDs with various types of system management compilation data subscriptions. For example, a subscriber entity may only be interested in system management compilation data associated with compute components. Accordingly, the subscription record(s) may therefore indicate that such a subscriber entity is only subscribed to receive a top ten list including the most frequent queries for system management compilation data representative of compute components.

In some embodiments, dispatcher 218 may be configured to distribute the system management compilation data to each SPD 212 and/or CMS 202 without any specific client entity subscriptions. In such a scenario, SPD 212 and/or CMS 202 may distribute or make available the system management compilation data to any interested client entity that conducts a query.

In some embodiments, dispatcher 218 may also be configured to push update data to a specific front end server 206 via SUA 210. For example, CMA server 204 may recognize that a particular front end server 206 repeatedly keeps requesting the same metric data (e.g., frequently/continuously querying for the same type of user activity reports). More specifically, if analyzer 216 determines that the same query or request is periodically (e.g., likely from a client program calling the API), CMA server 204 can prepare the update data and subsequently forward the update data to CMS server 202 in anticipation of receiving the query, thereby shortening the processing delay at CMA server 204.

Back-end server 208 can be any suitable entity or entities (e.g., software executing on one or more processors) for processing data associated with one or more data requests and/or providing system management query data to one or more requesting client entities (via front-end server 202). For example, back-end server 208 can include a computing platform containing one or more data structures containing information about components, a computing system, a group of computing systems, and/or services performed therein. In this example, back-end server 208 can generate, compute, and/or compile data associated with data requests and can provide the data to front-end server 206. In some embodiments, back-end server 208 is configured to propagate the best practice information to subscriber entities.

It will be appreciated that FIG. 2 is for illustrative purposes and that various components, their locations, and/or their functions as described above in relation to FIG. 2 can be changed, altered, added, or removed.

Figure 3:
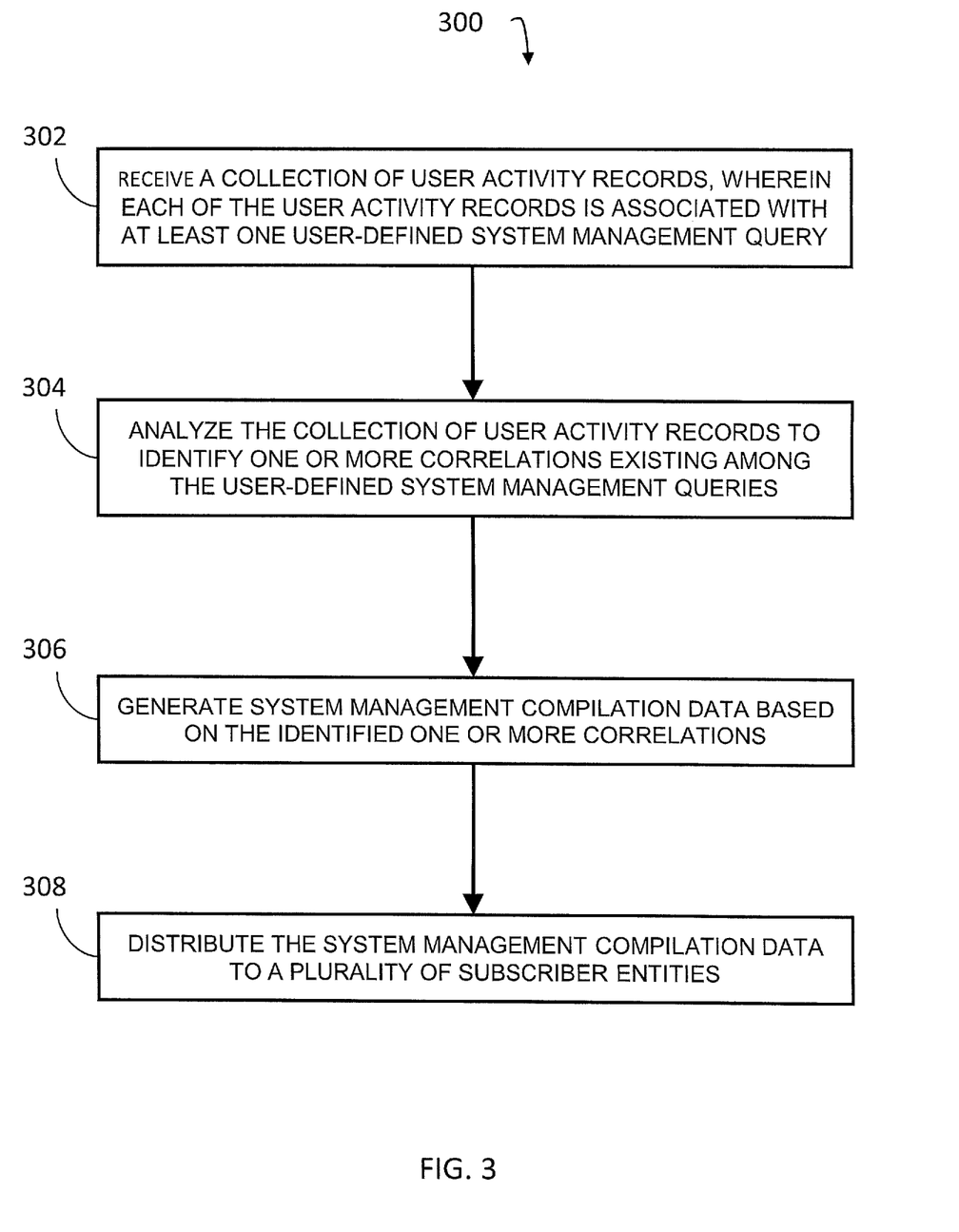
FIG. 3 is a diagram illustrating an exemplary method for sharing user activity data according to an embodiment of the subject matter described herein.

FIG. 3 is a diagram illustrating an exemplary method 300 for sharing user activity data according to an embodiment of the subject matter described herein. In some embodiments, exemplary method 300 and/or steps therein can be performed by CIS 100, CMA engine 104, CMA server 204, and/or another module or node (e.g., a computing platform containing one or more processors and memory). For illustrative purposes and explanation, references to entities included in FIGS. 1-2 may be used below.

At step 302, a collection of user activity records is received. In some embodiments, user activity records are received by collector 214 from at least one CMS 202. The collector 214 may then be configured to periodically aggregate all of the most recently received (e.g., since the last aggregation performed) into a collection of user activity records. Afterwards, the collection of user activity records can be sent from collector 214 to analyzer 216 for further processing. Notably, analyzer 216 is configured to receive, for analysis, user-defined system management query data originated from one or more client entities and/or across one or more computer systems.

At step 304, the collection of user activity records are analyzed to identify one or more correlations existing among the user-defined system management queries. In some embodiments, analyzer 216 may be configured to extract the system management query data from the received user activity reports and ascertain similarities or commonalities existing in the analyzed data with respect to some predefined criteria. In some embodiments, analyzer 216 may correlate, establish a ranking, prioritize, group, and/or sort the extracted system management query data based on various factors, such as the complexity of the data, the frequency of patterns associated with the data, the amount of processing time, the popularity or frequency of the query data, common data types, comparable performances, system component system component health, system component inventory, and the like. In some embodiments, analyzer 216 may correlate, establish a ranking, prioritize, group, and/or sort the extracted system management query data based on the type of entities that is the subject of the query, such as physical component types, virtual component types, compute component types, network component types, storage component types, and the like. For example, analyzer 216 may determine a correlation that indicates that a custom KPI for analyzing the performance of a virtual machine (e.g., VM 110 in FIG. 1) has been requested every thirty minutes for the last two hours.

At step 306, system management compilation data based on the identified one or more correlations is generated. In some embodiments, analyzer 216 packages metric data derived from the correlated system management query data into system management compilation data. In some embodiments, the system management compilation data may include a list of frequently requested data (e.g., custom KPIs) and/or queries, and/or user-defined KPIs, and the like. For example, the system management compilation data may be embodied as a top ten list or other ranked list of related system metric data (e.g., based on a particular domain/type of computing system components).

At step 308, the system management compilation data is distributed to a plurality of subscriber entities. In some embodiments, the system management compilation data is forwarded to a dispatcher 218 for delivery to one or more SPDs 212 associated with one or more CMS 202. For example, dispatcher 218 may include a subscription module that maps subscriber entities to the particular system management compilation data in which those subscriber entities are interested. Using the subscription information maintained by the subscription module, dispatcher 218 may send the system management compilation data to the appropriate SPD 212 for delivery to the subscriber entities (e.g., one or more of client entities 201). In some embodiments, a subscription is utilized in order to allow a subscriber entity or user to receive updates of a targeted set of queries. For example, a network administrator may subscribe to a number of network related queries and, as a result, subsequently a number of new network queries made by other subscriber users (e.g., all new network queries, a top 100 list of network queries, or a customizable subset) will be made visible and/or accessible to that network administrator.

In some embodiments, the distributed system management compilation data may be leveraged and/or enhanced by a subscriber entity. For example, a portion of the system management compilation data generated an original client entity (e.g., a first system administrator) may be modified by a subscriber entity (e.g., a second system administrator). Notably, the front-end server may permit the second system administrator to view the original query submitted by the first system administrator and subsequently modify the original query to produce an "enhanced query" that is better suited for the second system administrator's needs. For example, suppose both a system administrator "A" and a system administrator "B" are subscriber entities that subscribe to all queries and/or reports based on software defined network (SDN) queries. In the event system administrator A runs at least one query, system administrator B would receive the query as update data due to his subscription. In some instances, system administrator B may enhance (e.g., modify) one of the queries (e.g., add additional search criteria to make the query/request more specific). Such an enhancement may trigger the CMA server to generate a report with the enhanced query. Consequently, system administrator A may then receive update data containing this enhanced query due to system administrator A's subscription.

It should be noted that each of CMA engine 104, CMA server 204, and/or functionality described herein can constitute a special purpose computing system. Further, CMA engine 104, CMA server 204, and/or functionality described herein can improve the technological field of data management systems by sharing user activity data based on determined correlations existing within a collection of system management query data.

It will be understood that various details of the subject matter described herein can be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for sharing user activity data, the method comprising:
   receiving a collection of user activity records, wherein each of the user activity records includes user-defined system management query data;
   extracting the user-defined system management query data from the collection of user activity records, wherein the system management query data includes user-defined free form queries generated by a plurality of client entities, wherein the user-defined free form queries includes natural language queries;
   analyzing the extracted user-defined system management query data to identify one or more correlations existing among the user-defined free form queries, wherein the one or more identified correlations is based at least on metric data extracted from the user-defined system management query data;
   generating system management compilation data based on the identified one or more correlations existing among the user-defined free form queries;
   distributing the system management compilation data to a plurality of subscriber entities;
   producing an enhanced user-defined free form query based on an original user-defined free form query that is modified by one of the plurality of subscriber entities via a front end server and that is included in the system management compilation data;

providing the enhanced user-defined free form query to at least one of the plurality of subscriber entities as update data; and pushing additional update data for updating the system management compilation data to the front end server in response to determining that a same type of user activity records is requested on a periodic basis by the front end server.

2. The method of claim 1 wherein each of the user activity records includes at least one member selected from a group consisting of a search query, a user activity, a user input, a key performance indicator (KPI), a custom indicator, an access rule, a security policy, a quality of service (QoS) policy, historical information, preconfigured information, management information, and user preference information.

3. The method of claim 1 comprising aggregating the user activity records received from a plurality of management servers into the collection of user activity records.

4. The method of claim 1 wherein receiving the collection of user activity records includes receiving the collection of user activity records on a predefined periodic basis.

5. The method of claim 1 wherein analyzing the collection of user activity records includes ascertaining at least one pattern existing among the user-defined free form queries.

6. The method of claim 5 further comprising establishing one or more rankings based on the at least one ascertained pattern.

7. The method of claim 6 wherein the one or more rankings are established in accordance to at least one of a frequency, an origination time, and a system component domain associated with the user-defined free form queries.

8. A system for sharing user activity data, the system comprising:

a processor; and a communal management analysis (CMA) engine implemented using the processor, wherein the CMA engine is configured to receive a collection of user activity records, wherein each of the user activity records includes user-defined system management query data, to extract the user-defined system management query data from the collection of user activity records, wherein the system management query data includes user-defined free form queries generated by a plurality of client entities, wherein the user-defined free form queries includes natural language queries, to analyze the extracted user-defined system management query data to identify one or more correlations existing among the user-defined free form queries, wherein the one or more identified correlations is based at least on metric data extracted from the user-defined system management query data, to generate system management compilation data based on the identified one or more correlations existing among the user-defined free form queries, to distribute the system management compilation data to a plurality of subscriber entities, to produce an enhanced user-defined free form query based on an original user-defined free form query that is modified by one of the plurality of subscriber entities via a front end server and that is included in the system management compilation data, to provide the enhanced user-defined free form query to at least one of the plurality of subscriber entities as update data, and to push additional update data for updating the system management compilation data to the front end server in response to determining that a same type of user activity records is requested on a periodic basis by the front end server.

9. The system of claim 8 wherein each of the user activity records includes at least one member selected from a group consisting of a search query, a user activity, a user input, a key performance indicator (KPI), a custom indicator, an access rule, a security policy, a quality of service (QoS) policy, historical information, preconfigured information, management information, and user preference information.

10. The system of claim 8 wherein the CMA engine is further configured to aggregate the user activity records received from a plurality of management servers into the collection of user activity records.

11. The system of claim 8 wherein the CMA engine is further configured to receive the collection of user activity records includes receiving the collection of user activity records on a predefined periodic basis.

12. The system of claim 8 herein the CMA engine is further configured to ascertain at least one pattern existing among the user-defined free form queries.

13. The system of claim 12 herein the CMA engine is further configured to establish one or more rankings based on the at least one ascertained pattern.

14. The system of claim 13 wherein the one or more rankings are established in accordance to at least one of a frequency, an origination time, and a system component domain associated with the user-defined free form queries.

15. A non-transitory computer readable medium having stored thereon executable instructions which, when executed by a processor of a computer, cause the computer to perform steps comprising:

receiving a collection of user activity records, wherein each of the user activity records includes user-defined system management query data;

extracting the user-defined system management query data from the collection of user activity records, wherein the system management query data includes user-defined free form queries generated by a plurality of client entities, wherein the user-defined free form queries includes natural language queries;

analyzing the extracted user-defined system management query data to identify one or more correlations existing among the user-defined free form queries, wherein the one or more identified correlations is based at least on metric data extracted from the user-defined system management query data;

generating system management compilation data based on the identified one or more correlations existing among the user-defined free form queries; and distributing the system management compilation data to a plurality of subscriber entities;

producing an enhanced user-defined free form query based on an original user-defined free form query that is modified by one of the plurality of subscriber entities via a front end server and that is included in the system management compilation data;

providing the enhanced user-defined free form query to at least one of the plurality of subscriber entities as update data; and pushing additional update data for updating the system management compilation data to the front end server in response to determining that a same type of user activity records is requested on a periodic basis by the front end server.

16. The computer readable medium of claim 15 wherein each of the user activity records includes at least one member selected from a group consisting of a search query, a user activity, a user input, a key performance indicator (KPI), a custom indicator, an access rule, a security policy, a quality of service (QoS) policy, historical information, preconfigured information, management information, and user preference information.

17. The computer readable medium of claim 15 comprising aggregating the user activity records received from a plurality of management servers into the collection of user activity records.

18. The computer readable medium of claim 15 wherein analyzing the collection of user activity records includes ascertaining at least one pattern existing among the user-defined free form queries.

19. The computer readable medium of claim 18 further comprising establishing one or more rankings based on the at least one ascertained pattern.

20. The computer readable medium of claim 19 wherein the one or more rankings are established in accordance to at least one of a frequency, an origination time, and a system component domain associated with the user-defined free form queries.

* * * * *